United States Patent [19]
Monacelli

[11] Patent Number: 5,456,635
[45] Date of Patent: Oct. 10, 1995

[54] METHOD AND APPARATUS FOR PRODUCING ASSEMBLIES OF HEADED FASTENERS

[76] Inventor: Umberto Monacelli, via Parini, 6, I-20052 Monza, Italy

[21] Appl. No.: 199,806

[22] Filed: Feb. 22, 1994

[51] Int. Cl.⁶ ..................................................... B21G 5/00
[52] U.S. Cl. ................................. 470/40; 470/121; 219/79
[58] Field of Search .................................. 219/56, 58, 79, 219/80, 117.1; 140/111, 112; 470/7, 40, 121, 34, 5

[56]     References Cited

U.S. PATENT DOCUMENTS

| | | |
|---|---|---|
| 1,148,245 | 7/1915 | Martin et al. . |
| 2,153,702 | 4/1939 | Tighe . |
| 2,564,802 | 8/1951 | Coleman et al. . |
| 2,631,213 | 3/1953 | Martines . |
| 2,784,405 | 3/1957 | Working, Jr. . |
| 3,321,606 | 5/1967 | Cropp et al. ........................ 219/79 |
| 3,506,115 | 4/1970 | Heilman . |
| 3,634,934 | 1/1972 | Fitzgerald . |
| 3,635,389 | 1/1972 | Shibata . |
| 3,666,160 | 5/1972 | Gwyn, Jr. . |
| 3,669,334 | 6/1972 | Meisterling . |
| 3,854,648 | 12/1974 | Inzoli et al. . |
| 3,924,508 | 12/1975 | De Caro . |
| 4,932,187 | 6/1990 | Kraemer et al. . |
| 5,140,715 | 8/1992 | Monacelli . |

FOREIGN PATENT DOCUMENTS

| | | |
|---|---|---|
| 1348704 | 3/1974 | United Kingdom . |
| 1427128 | 3/1976 | United Kingdom . |

Primary Examiner—Lowell A. Larson
Attorney, Agent, or Firm—R. Lewis Gable

[57]     ABSTRACT

A method and apparatus is disclosed for affixing heads to headless fasteners to form webs thereof, wherein the headless fasteners are equally spaced apart a given spacing. The web of headless fasteners is conveyed to and disposed so that each of a first set of headless fasteners is disposed in an aligned relationship to corresponding ones of a plurality of "n" head affixing devices. The head affixing devices are spaced from each other a distance equal to the product of the given spacing and ("n"±1). The plurality of head affixing devices are actuated to fasten "n" heads to their aligned fasteners of the web. Thereafter, the web is moved with respect to the plurality of "n" head affixing devices a distance equal to the product of "n" and the given spacing to align each of a second, different set of fasteners of the web to corresponding ones of the plurality of "n" head affixing devices. The plurality of the head affixing devices are actuated for a time period during which each of the present set of headless fasteners is maintained in the aligned relationship with its corresponding one head affixing device. The web is repeatedly moved and the "n" welding devices are repeatedly actuated until a head is affixed to each headless fastener of the web.

28 Claims, 12 Drawing Sheets

METHOD AND APPARATUS FOR PRODUCING ASSEMBLIES OF HEADED FASTENERS

FIELD OF THE INVENTION

The present invention relates to fastener strips or assemblies. More particularly, the present invention is directed to an apparatus and a method for producing assemblies of headed fasteners, each comprising a head and a shank fixed in an aligned relationship with each other.

BACKGROUND OF THE INVENTION

The method of driving fasteners such as nails to secure materials together has changed considerably from the use of manual hammers to the use of rapid action nail driving tools. Such tools, to be fully utilized, require the nails to be collated in a strip or coil whereby many nails can be driven in a short period of time.

Over the past several years nail configurations have been designed to meet specific market needs but many of the configurations, especially the heads, were designed to match the tools. End users prefer a nail with a full round head, since it offers greater holding power due to the larger surface area under the head. This is particularly true where the layer directly under the head is constructed of a soft material such as insulation. In such applications, the shank portion provides very little holding power and the head is the only means that keeps the two workpieces from separating.

The most common method of making round head nails is to grip a single strand of wire in a device with a free portion extending from the clamping jaws. The end of the wire strand is struck by a powered ram. As the free portion is flattened, the wire material spreads outward in a spherical shape.

This flattened portion becomes the head and, at a predetermined distance from the head, the wire is cut to form the workpiece entering end, thus making a finished nail. The cutting device may be constructed to make entering ends of different shapes, e.g., blunt, pointed or chiseled.

To form an acceptable round head, the normal practice is to limit the ratio of the diameter of the head to the diameter of the wire shank to 2.5. Such practice naturally results in nails having small heads with the head size increasing as the wire becomes larger. Making nail heads with a smaller ratio is easy but increasing the ratio creates a number of problems.

To produce a relatively large head, a greater mass of wire is needed and a greater length of wire must extend from the clamping device. When the striking ram hits the end of the extended length of wire, the wire does not always deform equally in every direction. When the mass needed requires the wire to extend a relatively long distance, the extended length may distort as it is being flattened resulting in a head being formed off center of its shank. Although the surface area of such a head may be the same as a centered head and provide equal holding power, problems result when nails with the off-center heads are used in nail driving tools.

Another problem encountered is that the shape of the head may not be round but oval or some other odd shape. Some nail applications require that the shank of the nail be rather stiff to keep it from bending when driven into the workpiece. The wire used to produce such nails must be harder. When such wire is struck to form a head, the flow of material may not be constant resulting in splits around the outside edges of the resultant head.

Most nails are therefore produced with a head to shank diameter ratio of 2.5 or less to avoid off-center and/or non-round heads. "Roofing nails" deviate from this ratio, having a shank diameter of 3.1 mm with a head diameter of 10 mm. To produce "roofing nails" on standard nail making machinery requires that the wire used has a very low carbon content to minimize the problems described above. A head of such material is usually thin and will bend quite easily since the wire used is softer.

After the nails are produced, they are then collated in an assembly that is adapted to function in a particular powered nailing device. The assembly may be in the form of a strip of nails or rolled into a coil. The coil shaped assemblies are preferred since a larger quantity of nails can be placed in a nail driving device, assuming that the same size of tool is used for both strip and coil assemblies.

Although making the headed nail first and then collating them in an assembly is the most common practice used, U.S. Pat. No. 5,140,715 (assigned to the assignee of this invention) teaches an alternate method. This method of production is a continuous process starting with a strand of wire and ending with an assembly of headed nails. The head is formed on a series of headless nails after they have been collated in a continuous web. This method is an improvement over previous teachings, but it too places restrictions on the finished product. Since the head is formed by a punch the head diameter cannot be greater than the spacing between the headless nails of the continuous web. By making the web with off setting headless nails, a larger head could be formed if the punch struck only one nail at a time. But this would defeat the cost saving feature which results from the production method of U.S. Pat. No. 5,140,715.

Even if the larger heads could be formed, the disadvantages or restrictions in producing large head nails first and then collating would still exist. Applications for large head nails have increased, many of which cannot accept the restrictions placed upon the finished nail by present nail producing methods. One solution to the problem is to first produce a standard nail and insert it into a washer prior to driving. This can be done as two separate parts during the driving process or have the washer attached to the nail previously. In either case, the cost of the final product increases considerably.

Variations of nail strips are shown in U.K. patent nos. 1,348,703 and 1,427,128. U.S. Pat. Nos. 2,784,405 and 3,506,115 show nails inserted in a carrier strip that is sheared during the driving operation. Although the material under the head remains with the nail, the purpose of the strip is to allow automatic feeding of nails by the nail driving tool. All of these mentioned patents teach the process of producing the assembly of nails starting with a headed nail which is inserted through a hole in a strip of metal to produce the nail assembly.

SUMMARY OF THE INVENTION

It is therefore an object of the present invention to provide a new method of producing an improved assembly of nails.

Another object of this invention is to provide a method of producing an assembly of nails having size and shape of the head of the nail unrestricted by the size or type of wire used to produce its shank.

Another object of this invention is to provide a method of producing in a continuous process, assemblies of nails having head to shank diameter ratios in excess of the standard 2.5.

In accordance with these and other objects of the invention, this invention relates to the method and apparatus for affixing heads to headless fasteners to form webs thereof, wherein the headless fasteners are equally spaced apart a given spacing. The web of headless fasteners is conveyed to and disposed so that each of a first set of headless fasteners is disposed in an aligned relationship to corresponding ones of a plurality of "n" head affixing devices. The head affixing devices are spaced from each other a first distance equal to the product of the given spacing and an integral number other than "n". Illustratively the first distance is set equal to "s"×[("m"×"n")±1], where "m" is an integral number. The plurality of head affixing devices are actuated to fasten "n" heads to their aligned fasteners of the web. Thereafter, the web is moved with respect to the plurality of "n" head affixing devices a second distance sufficient to align each of a second, different set of fasteners of the web to corresponding ones of the plurality of "n" head affixing devices. The second distance is illustratively set equal to the product of "n" and the given spacing. The plurality of the head affixing devices are actuated for a time period during which each of the present set of headless fasteners is maintained in the aligned relationship with its corresponding one head affixing device. The web is repeatedly moved and the "n" welding devices are actuated until a head is affixed to each headless fastener of the web. A head is supplied from a source to the headless fastener aligned at each of the "n" head affixing devices before the "n" plurality of head affixing devices are actuated.

In a further aspect this invention, an assembly of fasteners, namely a web thereof, has a reference line, and comprises a plurality of fasteners. Each fastener includes a shank and a head affixed to one end of the shank, the heads having a common dimension. A collating member releasably holds the plurality of fasteners together as the web with each of the plurality of fasteners in a parallel relationship to each other, spaced at a common spacing from each other and disposed at an acute angle with respect to the reference line. Thus, the common spacing may be made less than the dimension and the assembly may hold increased numbers of the fasteners for a given size of the assembly.

In a still further aspect of this invention, a strand of wire is machined to provide assemblies or webs of headed fasteners. First, the strand of wire is cut into headless fasteners of a selected, uniform length. The headless fasteners are then aligned in a parallel relationship to each other and equally spaced a given spacing from each other, before being collated to form a continuous web of the headless fasteners. The continuous web of collated headless fasteners is moved to and stopped so that one headless fastener of the web is aligned with respect to a head welding device. One head is supplied at a time to the head welding device. The web is held stationary, while the head welding device is actuated to weld the supplied head on one end of the aligned fastener of the continuous web.

When a plurality of "n" head welding devices are utilized to increase the rate of production, the "n" head welding devices are spaced from each other a distance equal to the product of the given spacing and ("n"±1). The web of headless fasteners is moved and a first selective set of the headless fasteners thereof is aligned to corresponding ones of the plurality of "n" head welding devices. Then each of the plurality of "n" welding devices is actuated to weld a head to each of the aligned headless fasteners of the first selective set, before the web is again moved with respect to the plurality of "n" head welding devices a distance equal to the product of "n" and the given spacing to align each of a second, different set of the headless fasteners to corresponding ones of the plurality of "n" head welding devices.

BRIEF DESCRIPTION OF THE DRAWINGS

These and other objects of this invention will be seen from the description and accompanying drawings, in which.

DESCRIPTION OF THE PREFERRED EMBODIMENT

Figure 1:
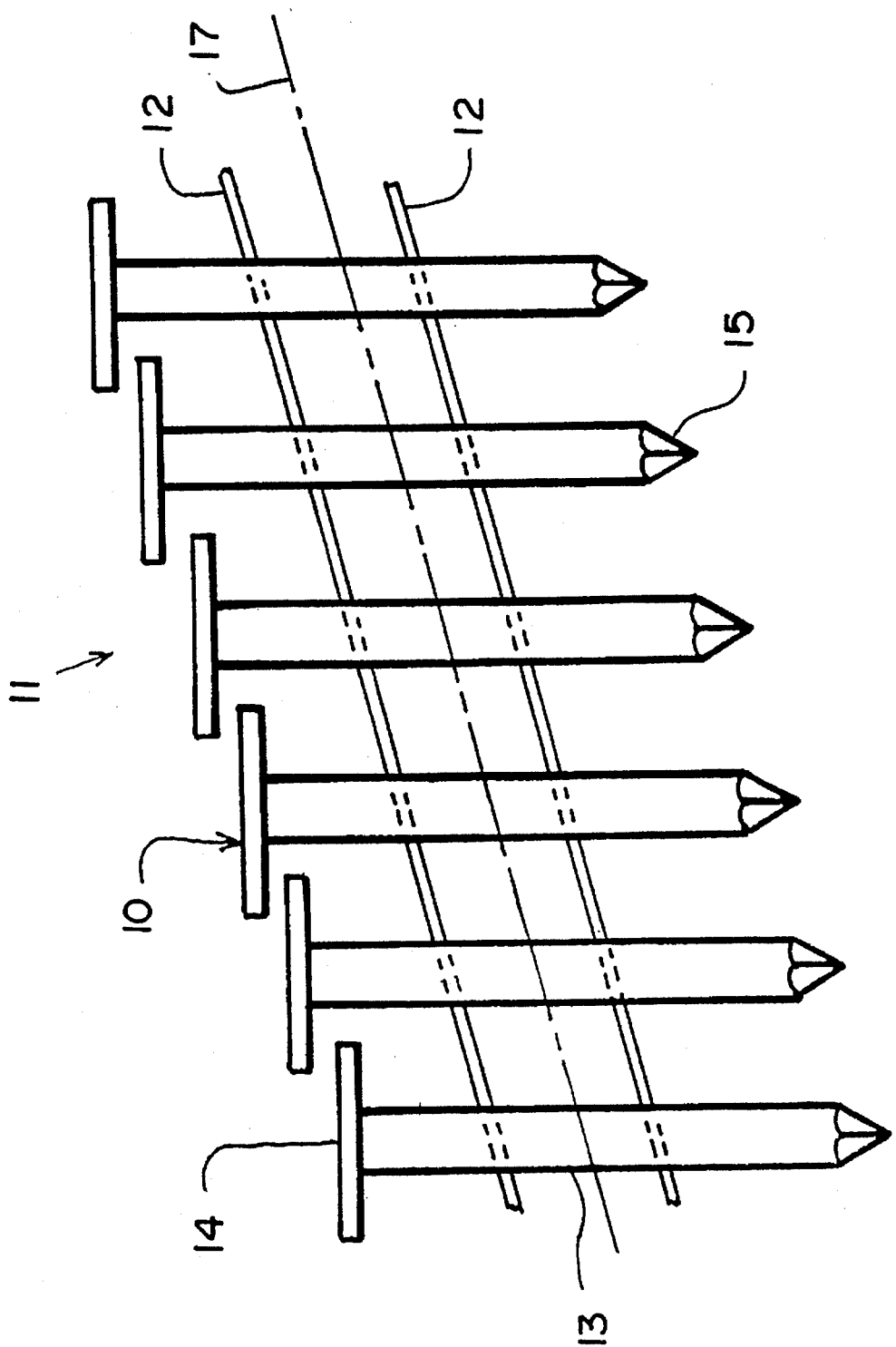
FIG. 1 is a perspective view of a fastener assembly comprised of spaced apart, parallel angled fasteners welded to two parallel strands of wire.

Referring now to the drawings wherein like reference characters represent like elements, FIG. 1 illustrates an embodiment of a fastener assembly 11 produced in accordance with the present invention. The assembly 11 of headed fasteners 10 produced in accordance with the present invention generally comprise a series of headed fasteners 10 fixed in a parallel relationship. The fasteners 10 are held in a parallel relationship by the use of collating members 12, e.g., wires.

Each headed fastener 10 of the assembly 11 of fasteners comprises a driver striking end or a head 14, a shank 13 and a workpiece entering end 15. The head 14 of the fastener 10 imparts the holding power to the fastener 10 after the fastener 10 has entered its workpiece. The shank 13 is the long body portion of the fastener 10, connecting the head 14 of the fastener 10 and the workpiece entering end 15. The shank 13 is normally of circular cross section but may be of any cross-sectional shape identical to the cross-sectional shape of the strand of wire from which the shank 13 is formed. It will be appreciated that to increase the holding power of headed fasteners, the shank surface may be deformed by notching or roughened. The deformation may occur prior to use or may be done by the wire feeding means during the practice of the present invention as to be more fully described herein. The workpiece entering end 15 of the headed fastener 10 is formed as a round, diamond, chisel or blunt point and facilitates in the ease of entry of the fastener as the fastener enters the workpiece.

The collating members 12, as illustrated in FIG. 1, are comprised of at least one strand of wire welded to the shank 13 of each fastener 10 to fix the fasteners 10 in a spaced-apart, parallel relationship to form the assembly 11 of headed fasteners 10.

Figure 2:
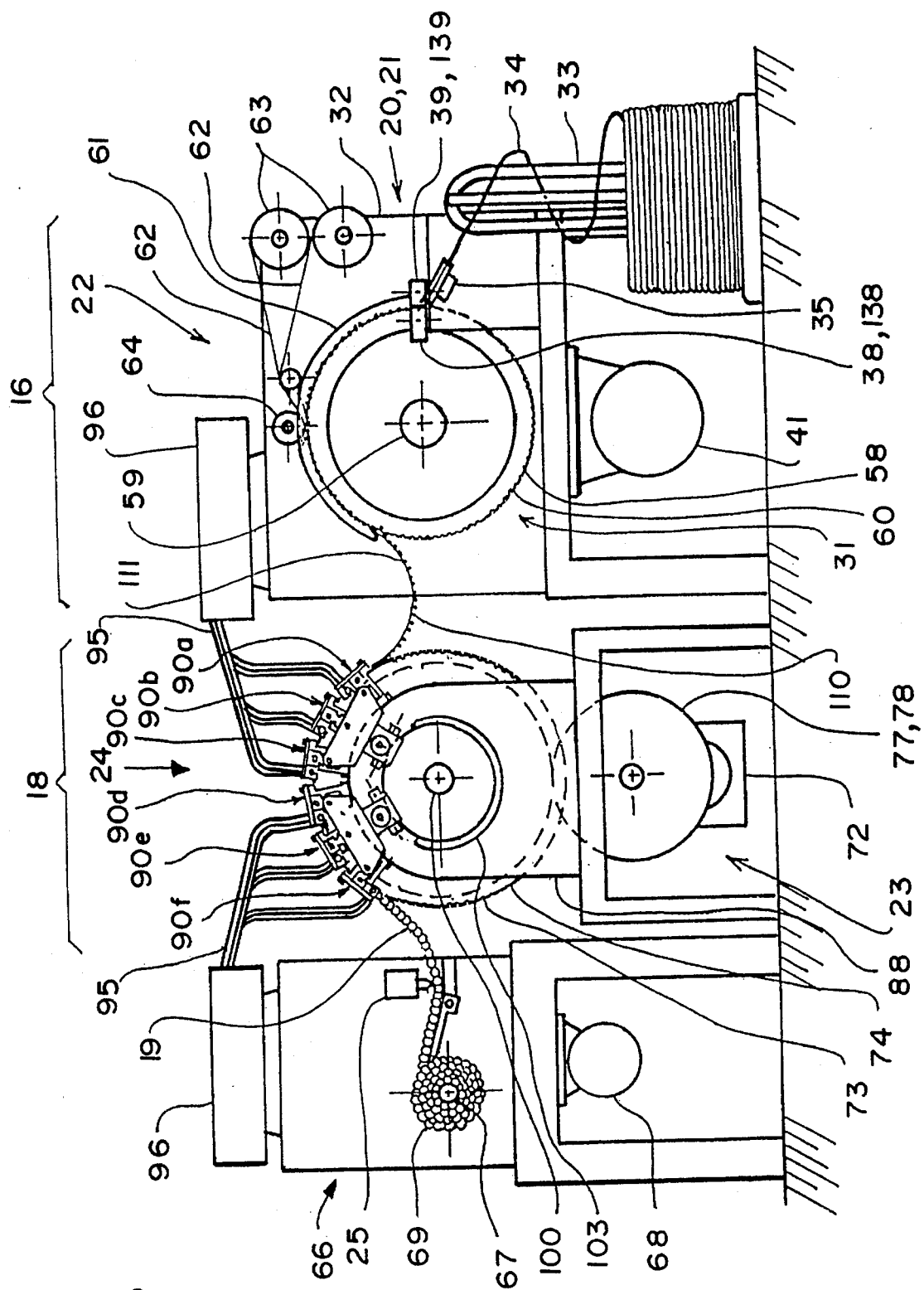
FIG. 2 is a side elevational view of the apparatus used to form the assemblies of fasteners according to the present invention.
Figure 3:
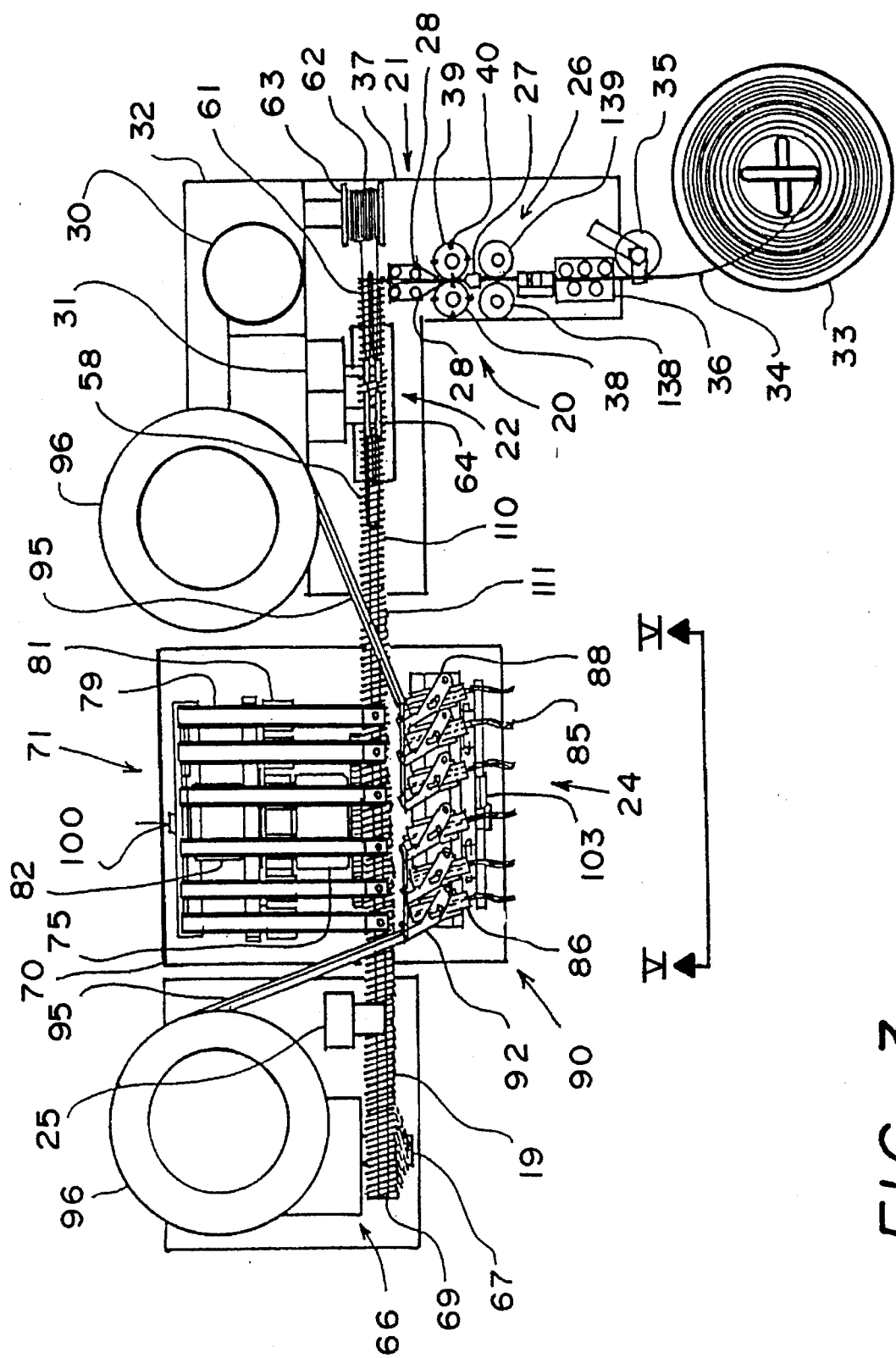
FIG. 3 is a top plan view of the apparatus used to form the assemblies of fasteners as shown in FIG. 2.

The device for producing the fasteners of the present invention as illustrated in FIGS. 2 and 3 generally comprises a first workstation 16 which includes a headless fastener producing assembly 20, a transfer assembly 21, a collating assembly 22 and a feeding assembly 26, and a second work station 18 which includes a head welding assembly 24, a conveying assembly 23 and a severing device 25.

The headless fastener producing assembly 20 of the present invention is illustrated in FIGS. 2 and 3. The headless fastener producing assembly 20 is typically driven by an electric motor 30 through a gear train (not shown). The gear train and electric motor 30 are mounted on a vertical support frame 32.

It will be appreciated that the present invention may include the use of more than one strand of wire 34. Multistrand feeding and cutting is well known in the art and has been used for producing fasteners such as staples and pins. The multiple strands of wire may be provided to the feeding assembly 26 and the headless fastener producing assembly 20 designed for multistrand feeding and cutting. Unless otherwise indicated, as used herein the term "wire" is to be interpreted as including one or more strands of wire.

Referring to FIGS. 2 and 3, the preferred embodiment of the present invention is illustrated. The wire 34 is stored on a carrier 33 disposed in the vicinity of the first work station 16. The wire 34 is guided from the carrier 33 to a set of straightening guides 36 by way of a pulley 35. In operation, at least one strand of wire 34 enters the set of wire straightening guides 36. The set of guides 36 straightens the wire 34 in the event that the wire is bent or twisted. It will be appreciated that because a large quantity of wire is used in a short period of time, the wire is usually supplied on very large spools or carriers 33.

Thus due to the loading and handling of the wire carriers 33, the wire 34 may become bent or twisted resulting in an unacceptable end product unless the wire 34 is straightened before a web 111 of headless fasteners 110 of the invention is formed. The set of wire straightening guides 36 may be of a standard commercial type that is available in a variety of shapes and sizes. In a preferred embodiment, there are two sets of wire straightening guides 36. The sets are mounted on a feeder/cutter support frame 37, one set in front of the other, so that the wire 34 enters and passes between the first set of guides 36 to the second set of guides mounted directly behind. Although the set of guides 36 is shown to have rollers and the sets are positioned at 90°, this is a matter of choice. The only requirement of the set of wire straightening guides 36 is that the wire 34 is straightened before the wire enters the feeding assembly 26 which is comprised of feed wheels 138 and 139. The feed wheels 138 and 139 are mounted on the feeder/cutter support frame 37 directly after the set of straightening guides 36 with the axis of each of the feed wheels 138 and 139 perpendicular to the path of the wire 34 and perpendicular to the plane formed by the feeder/cutter support frame 37. The gripping surface of the feed wheels 138 and 139 may be contoured to deform the exterior surface of the fastener shank 13 to provide increased holding power. The feed wheels 138 and 139 are positioned on each side of the wire 34 and engage against the wire 34 so as to prevent the wire 34 from slipping from between the feed wheels 138 and 139. The wire 34, positioned between the pair of feed wheels 138 and 139, is then pulled through the set of straightening guides 36 by the rotation of the feed wheels 138 and 139. It will be appreciated that even if the gripping force of the feed wheels 138 and 139 were so great as to make a small flat on each side of the wire 34, the flat would have absolutely no effect on the process or the headed fastener 10 produced thereto.

The wire 34 leaving the feeding wheels 138 and 139 passes through a support frame 27 used to align the wire 34 with the headless fastener producing assembly 20 which severs the continuous wire 34 to produce the headless fasteners 110. The preferred embodiment has the feeding wheels 138 and 139 and the headless fastener producing assembly 20 spaced a distance apart for convenient servicing and change over for various size fasteners. The support frame is located therebetween to direct the wire 34 to the correct position for cutting. The feeding assembly 26 and the headless fastener producing assembly 20 could of course be positioned much closer to each other and reduce the size of or eliminate the support frame 27 completely.

The headless fastener producing assembly 20 is comprised of two wheels having parallel axis and at least one wire cutter located on the circumference. Each of a pair of cutting wheels 38 and 39 has insets 40 that may be specifically spaced around the circumference of each wheel to correspond to the desired length of the particular headless fastener 110 to be produced. Each of the cutting wheels 38 and 39 has the exact same number of and positions of the insets 40 and each of the cutting wheels 38 and 39 is interlocked with a gear train (not shown) to assure that each inset 40 on each cutting wheel 38 and 39 contacts on exactly opposite sides of the wire 34. Each inset 40 contains an edge that is shaped to cut the wire 34 into individual headless fasteners 110 as the wire 34 passes thereby.

Because the insets 40 are spaced equally about the circumference of each cutting wheel 38 and 39, each headed fastener 10 produced is of a uniform length within certain prescribed manufacturing tolerances. The uniform positioning of the insets 40 about the circumference of the cutting wheels 38 and 39 eliminates the intermixing of odd size headed fasteners 10 in the assemblies 11 of headed fasteners 10. It will be appreciated that by changing the spacing of the insets 40 about the circumference of each wheel 38 or 39, a different length of headless fastener 110 may easily be produced.

The headless fastener producing assembly 20 described is ideal when one length of a headed fastener 10 can be produced in very large quantities. In reality due to the many various sizes of fasteners 111 required, the need to change from one length to another occurs quite often. Anticipating this situation, the preferred embodiment is designed to provide a peripheral velocity of the wire feeding wheels 138 and 139 less than that of the wire cutting wheels 38 and 39. This can be accomplished by setting the speed of the headless fastener producing means 20 and controlling the speed of the feeding assembly 26 through a variable regulator (not shown). By reducing the peripheral velocity of the feed wheels 138 and 139, the length of the headless fastener 111 is shortened. Likewise increasing the velocity will produce longer headless fasteners 111 up to the maximum spacing between the cutting insets 40 in the cutting wheels 38 and 39. This system eliminates the downtime needed to change components compared to a system wherein both the feeding assembly 26 and headless fastener producing assembly 20 have fixed speeds.

The individual headless fasteners 110 having been produced by the cutting wheels 38 and 39 must now be transferred onto a collating track 31 for collating the headless fasteners 110 in a spaced apart, parallel relationship. The collating track 31 in part comprises a rotatable gear 58 having slots 60 spaced along the outer periphery of the gear 58 corresponding to a predetermined spacing requirement for a particular assembly 11 of the headed fasteners 10. The gear 58 is mounted on a shaft 59 with the axis of the shaft positioned to allow the slots 60 to be parallel with the movement of the headless fasteners 110 as they are transferred from the headless fastener producing means 20 to the collating track 31.

The transfer assembly 21 can be as simple as a guide tube to direct the headless fasteners 110 into the slots 60 in the gear 58. For short headless fasteners 110 this will work satisfactorily, but for longer fasteners 110 the preferred embodiment is to have the transfer assembly 21 include powered wheels 28. The wheels 28, one on each side of a headless fastener 110, have a peripheral speed considerably higher than that of the cutting wheels 38 and 39.

In order for the headless fastener 110 to be collated in the parallel relationship, the slots 60 in the gear 58 are preferred to be only slightly larger than the diameter of the shank 13 of a particular fastener 110. The gear 58 thus stops during the time needed to introduce the headless fastener 110 into the slot 60. The headless fastener 110 does not have to be transferred a precise distance into the slot 60, but at least enough for stability. Since the time the gear 58 is stopped for the transfer affects the quantity of headed fasteners 10 produced per minute, the time used for transferring should be reduced as much as possible.

By having the transfer wheels 28 run at a higher speed than the headless fastener producing assembly 20, each individual headless fastener 110 can be transferred into a slot 60 and then the gear 58 indexes to the next position as each succeeding headless fastener 110 is being produced. The movements of the gear 58, the headless fastener producing assembly 20 and the transfer assembly 21 are driven by a motor 41 through a synchronized drive train (not shown). The rotation of the cutting wheels 38 and 39 and powered wheels 28 is continuous whereas the rotating gear 58 has a high speed stutter step motion. It will be appreciated that although a rotating gear 58 is the preferred embodiment, the present invention may also utilize a toothed chain or track in place of the gear 58.

The headless fasteners 110 are tightly seated in the slots 60 by a retaining bar 61 spaced apart from and positioned around a portion of the circumference of the rotatable gear 58. The retaining bar 61 assures the headless fasteners 110 remain parallel during the time they are collated to form the continuous web 111 of headless fasteners.

One type of collating member utilized is a strand of wire 62 electrowelded tangentially to the shank of each headless fastener 110. A spool 63 of the wire 62 is positioned in a convenient location for loading and unloading as the wire 62 is used. The wire 62 is conveyed from the spool 63, around an electrode 64 and then pressed against a headless fastener 110 held within a slot 60 in the gear 58 by the electrode 64.

Figure 4:
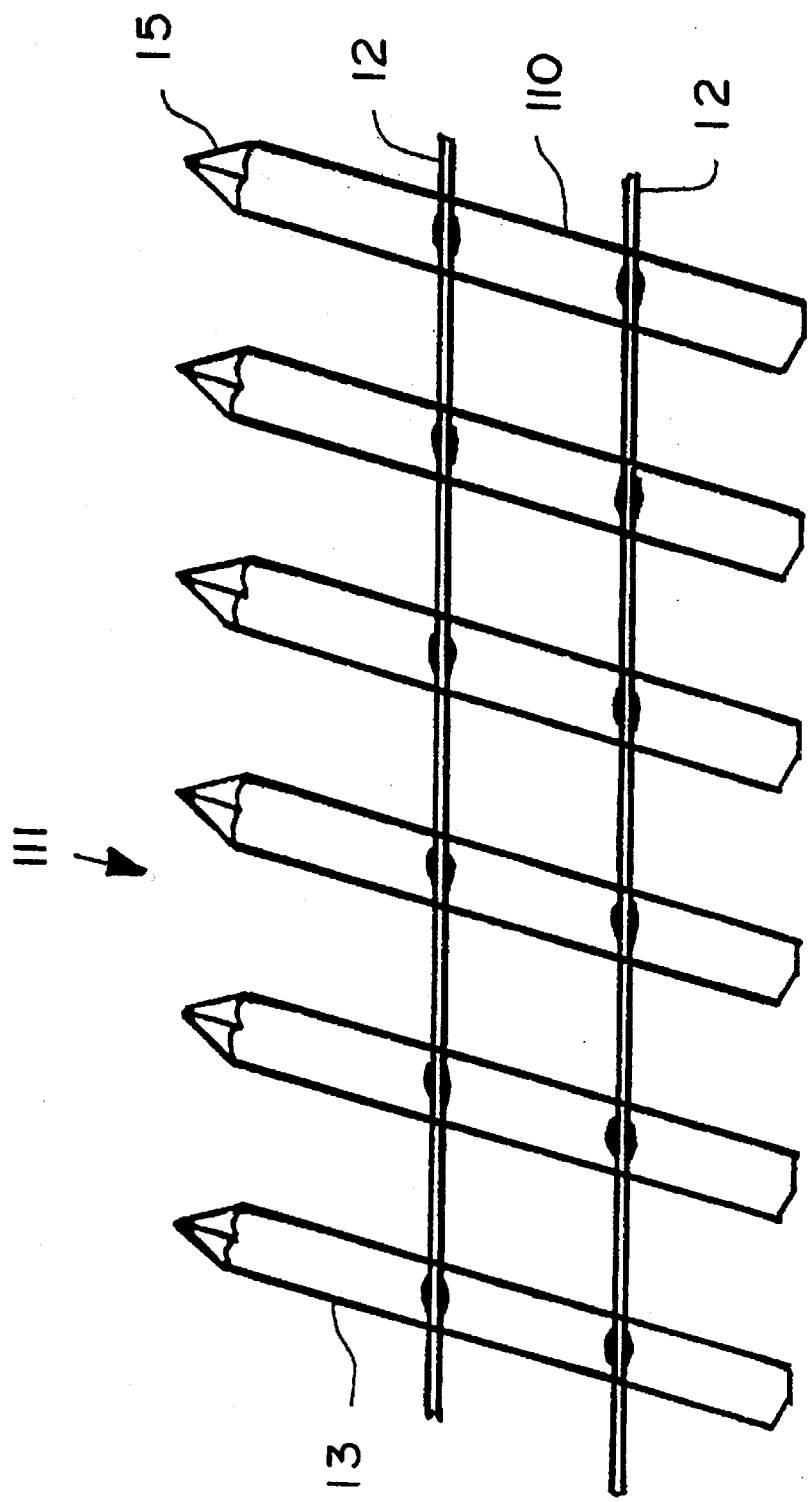
FIG. 4 is a top plan view of the continuous web of headless fasteners produced at a first workstation of the apparatus shown in FIGS. 2 and 3.

The electrode 64 is then subjected to an electrical impulse. The contacting surfaces of the wire 62 and the headless fastener 110 within the gear 58 are welded together by the heat generated by the electrical impulse. The rotating gear 58 repeatedly brings each succeeding headless fastener 110 held within the slot 60 against the wire 62 and along side the electrode 64. As the wire 62 is pressed against the shank 13 of the next succeeding headless fastener 110 by the electrode 64 and rotating gear 58, the electrical impulse welds the wire 62 to the shank 13 of each headless fastener 110 to form the web 111 of fasteners 110. As the continuous web 111 of headless fasteners 110 is formed, wire 62 is constantly pulled from the spool 63 by the motion of the wire welded headless fasteners 110 away from the spool 63. To reduce wear and friction, it is preferred to have the electrode 64 constructed as a roller mounted on a shaft with the axis of the roller disposed parallel to the axis of the rotating gear 58 and positioned against the wire 62 that is to be welded to the headless fasteners 110 located within the slots 60 in the outer periphery of the rotating gear 58. In a preferred embodiment, two parallel wires 62 are welded on the same side of each headless fastener 110 as illustrated in FIG. 4. The two parallel wires 62 assure that the headless fasteners 110 are maintained in a fixed, equally spaced-apart parallel relationship.

To produce an assembly 11 of the headed fasteners 10 from the continuous web 111 of headless fasteners 110, the web 111 is fed from the first workstation 16 to the second workstation 18 and, in particular, to its head welding assembly 24 by the conveying assembly 23. As illustrated in FIGS. 2, 3 and 5–9, the conveying assembly 23, a clamping device 71, and the head welding assembly 24 are mounted on a base 70. Because of the high speed, over 1000 per minute, of producing the headed fasteners 10, the sequence of each operation must be controlled accurately. The preferred embodiment is to have all movements synchronized through a gear train, that will be detailed below, and driven by a single motor 72.

Referring now to FIGS. 2, 3, 5 and 6, the continuous web 111 of headless fasteners 110 is transferred onto a conveying track 29 for moving the headless fasteners 110 in position to have a head 14 welded to each thereof. The conveying track 29 in part comprises a rotatable gear 73 having a plurality of slots 74 spaced equal distances about the outer periphery of the gear 73 corresponding to the spacing between consecutive ones of the headless fasteners 110 of the web 111. The gear 73 is mounted on a vertical support 75 by means of a bearing 76, as shown in FIG. 7. The gear 73 is rotated in a stutter step motion by an indexing head 77 and a gear 78. The gear 73 has teeth about a second peripheral surface that mesh with the teeth on the gear 78. Thus when gear 78 is rotated, gear 73 also rotates. Likewise when gear 78 which is mounted on the indexing head 77 moves with a stutter step motion, so does gear 73. The indexing head 77 is driven by being coupled directly to the motor 72.

As shown in FIGS. 3 and 7, the clamping device 71 in part comprises an arm 79 rotatably mounted on a pivot 80 held by a bracket 81 which in turn is attached to a vertical support 82. The pivot 80 is positioned perpendicular to the axis of the gear 73. A front portion 83 of the arm 79 extends over the periphery of the gear 73 and is normally biased in a position away from the gear 73 by a spring 84.

Figure 5:
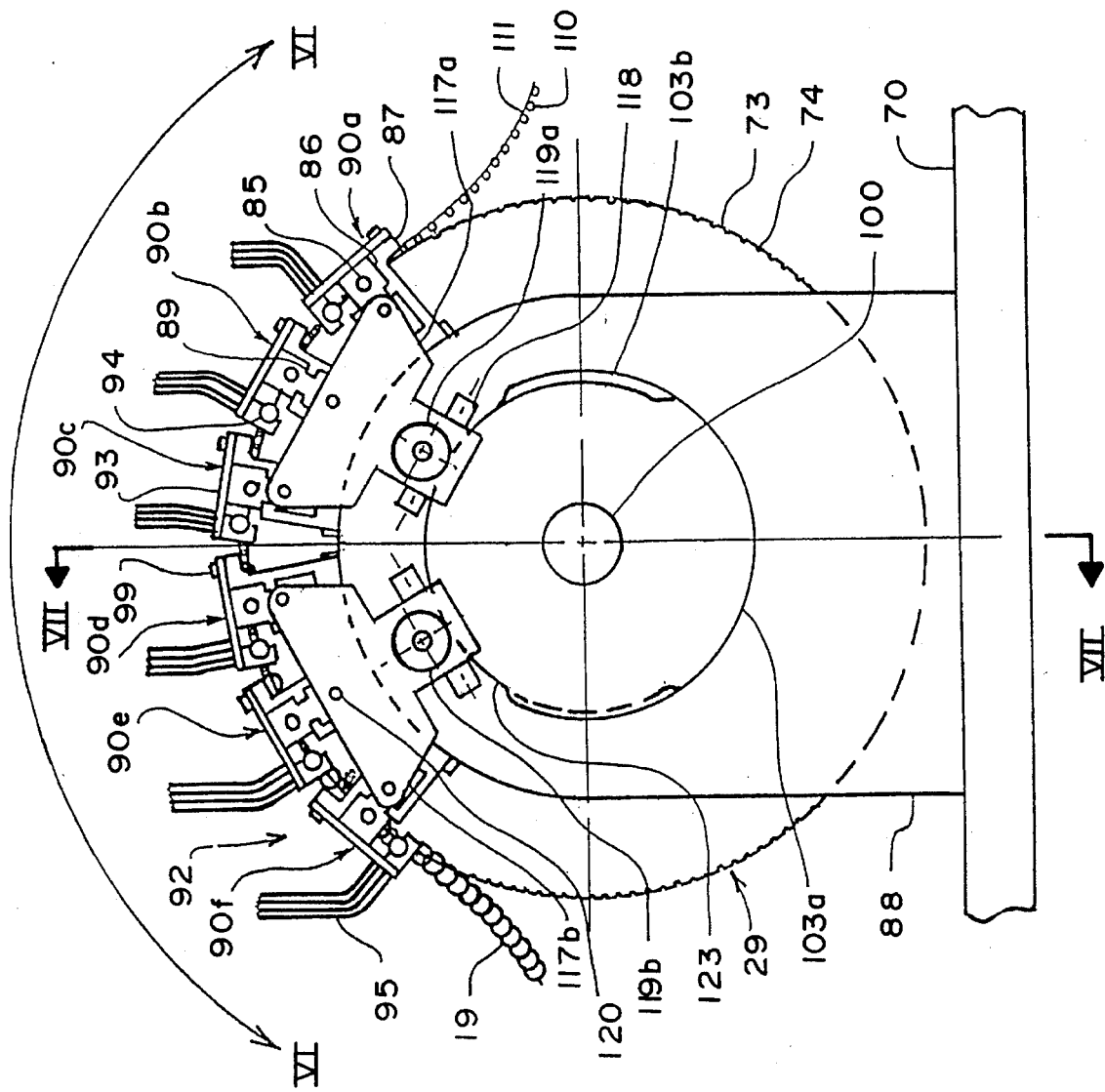
FIG. 5 is a partial side elevational view of the second workstation as taken along line V—V of FIG. 3.

A head welding device 90 in part comprises an electrode 85 mounted in a housing 86. The housing 86 is retained in a fixture 87 which is attached to a vertical support 88. The housing 86 has guideways 89, as shown in FIG. 5, mating with gibs within the fixture 87 which allows the housing 86 to have a rectilinear movement toward and away from the gear 73. Housing 86 is normally biased away from gear 73 by a spring 91.

Figure 6:
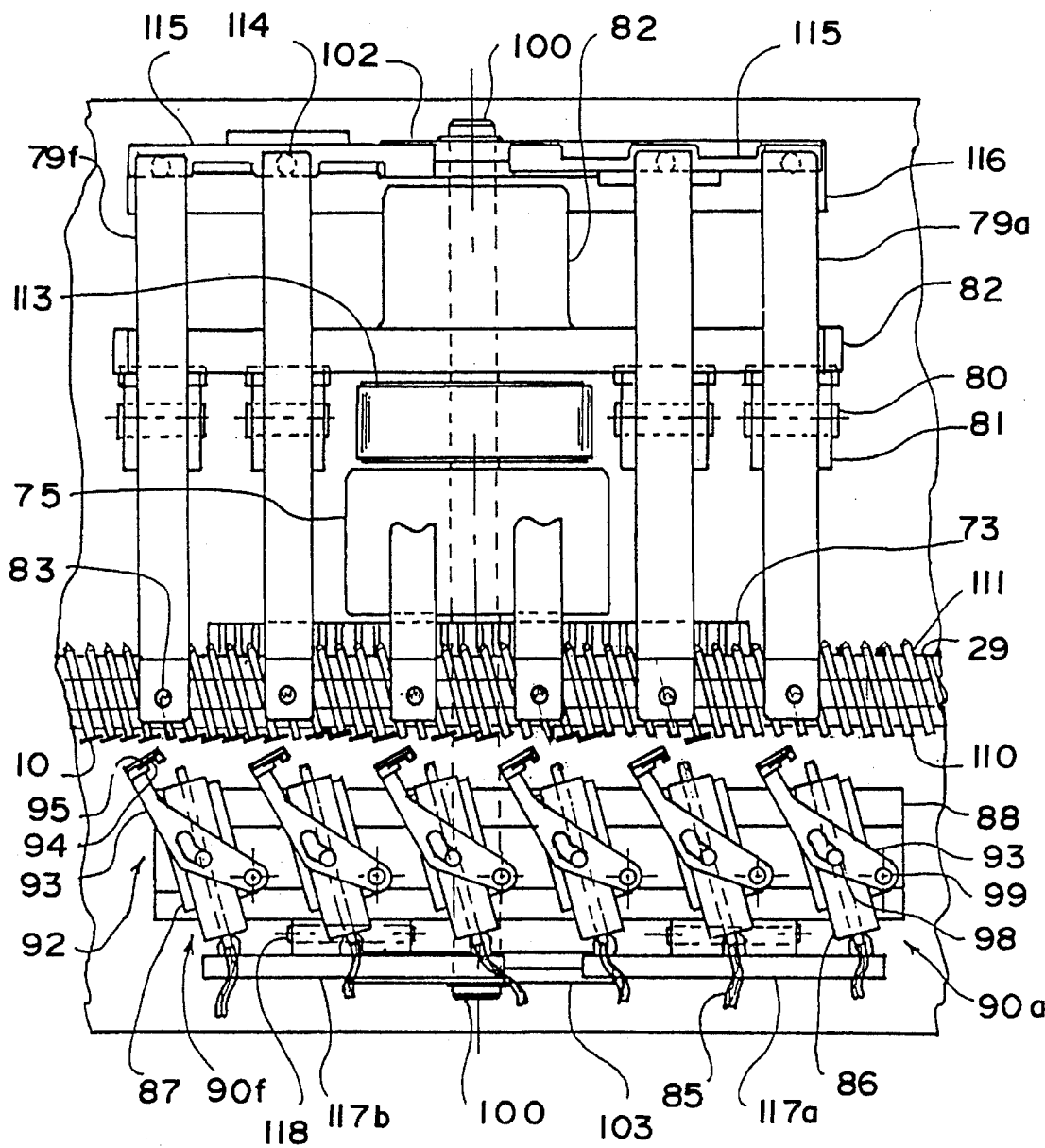
FIG. 6 is a partial top view of the second workstation as taken along line VI—VI of FIG. 5.
Figure 7:
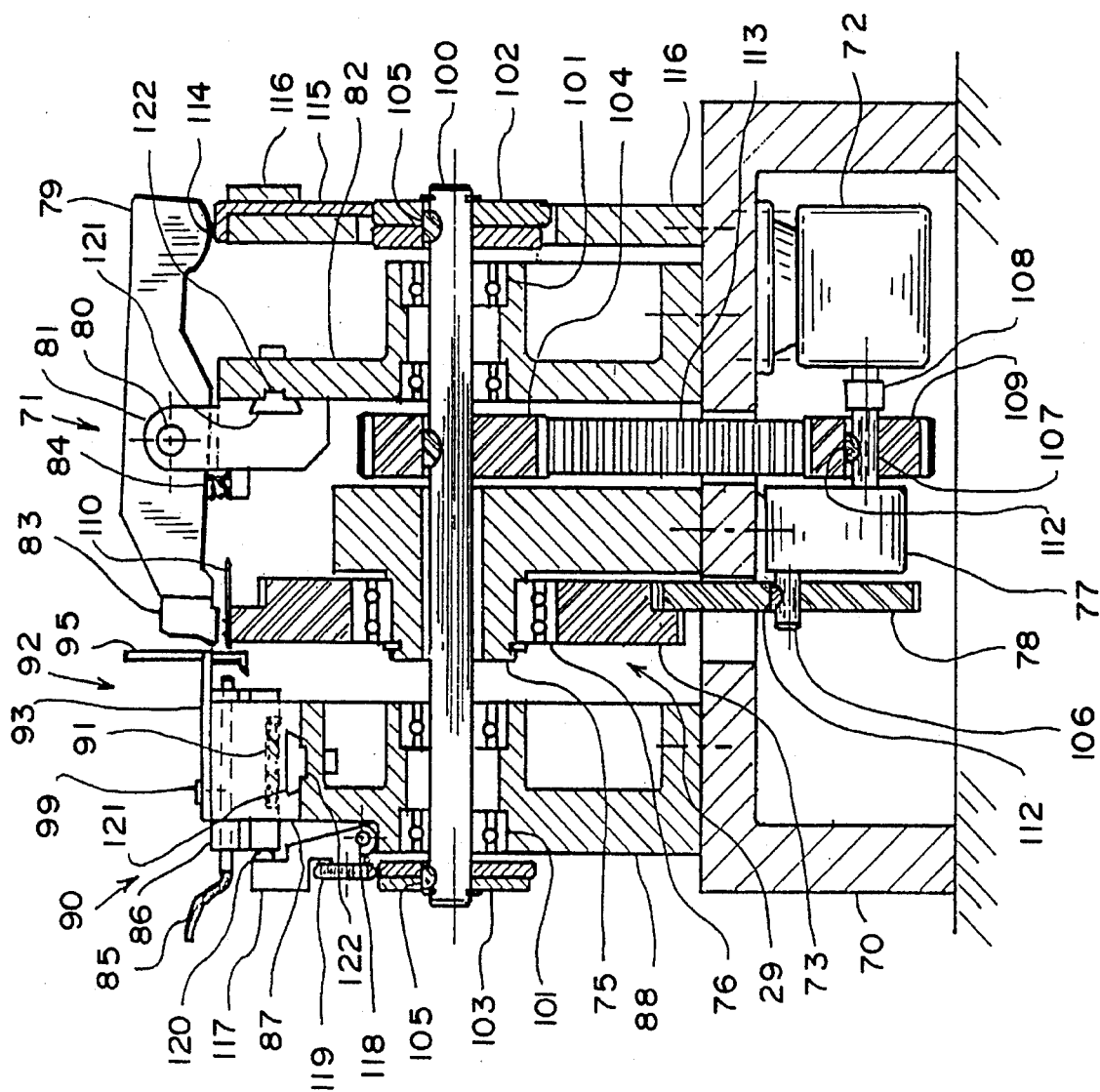
FIG. 7 is a cross-sectional view of the conveying and head welding devices taken along line VII—VII of FIG. 5 while the continuous web is conveyed.
Figure 8:
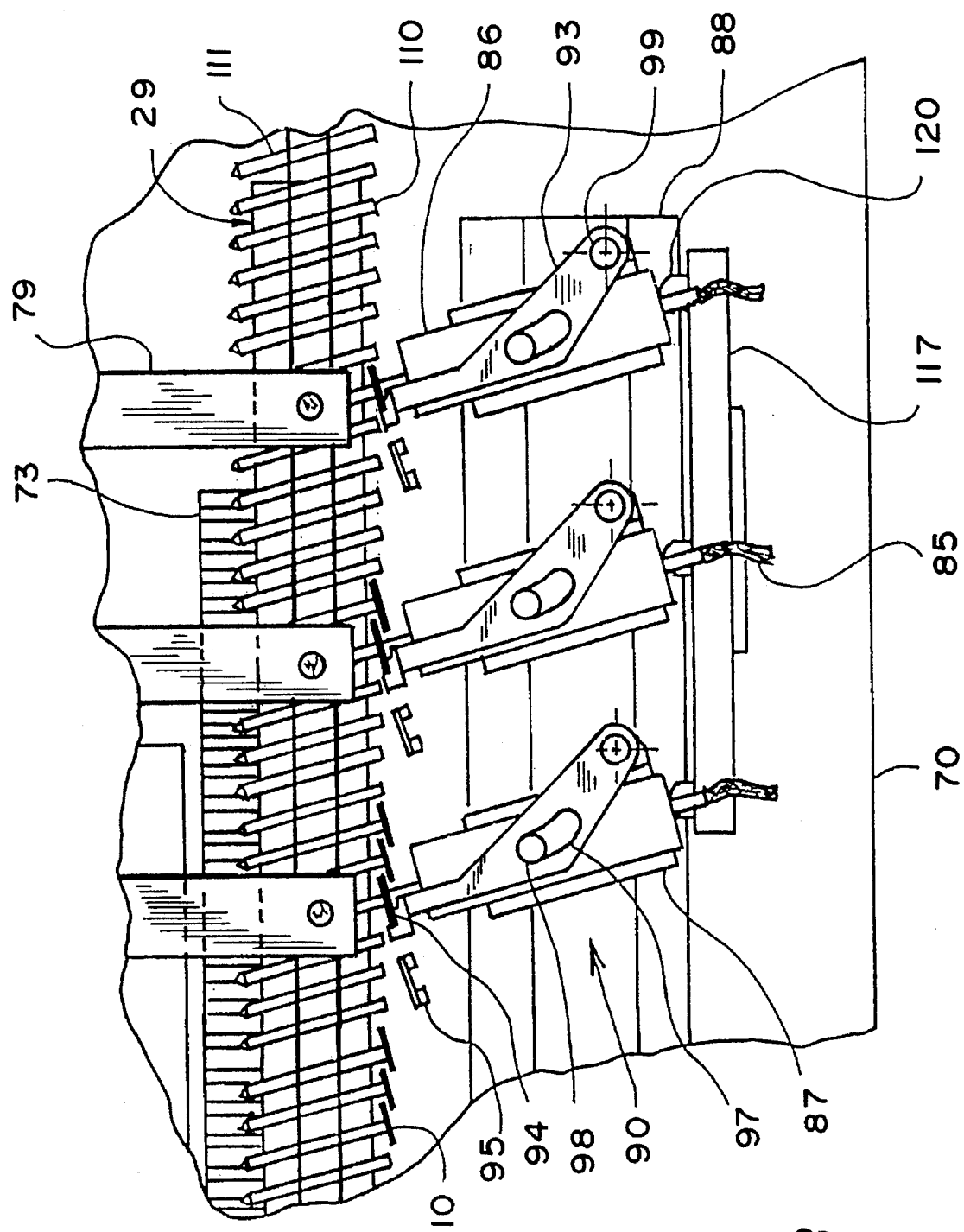
FIG. 8 is a partial enlarged view of FIG. 6 showing three head welding stations during a head welding operation.

As best shown in FIGS. 6 and 8, a head positioning device 92 in part comprises a head positioning arm 93 pivotally mounted on the fixture 87. The arm 93 includes a free end for supporting a cavity 94 for receiving a head 14. The cavity 94 is normally aligned as shown in FIGS. 6 and 7 with a head dispensing tube 95 that transfers one head 14 at a time from a head storage bin 96 (see FIG. 2) into the cavity 94 of the arm 93. The head positioning arm 93 is rotatively driven, as will be explained below, between a first position as shown in FIG. 6 and a second position as shown in FIG. 8 wherein the cavity 94 delivers its head 14 into an aligned position to be welded to one of the headless nails 110. The head storage bin 96 is a readily commercial available device that stores a large quantity of elements such as the heads 14 and has a vibrating mechanism to separate and advance the elements, a head 14 in the present invention, into the dispensing tube 95.

As shown in FIGS. 6-8, the head positioning arm 93 has a contoured slot 97 through which a pin 98 mounted on the housing 86 protrudes. The contoured slot 97 is of such shape that as housing 86 moves forward within the fixture 87, the pin 98 causes the arm 93 to pivot about a stud 99 to dispose the cavity 94 containing a head 14 in direct alignment and in front of the electrode 85 mounted in the housing 86. When the housing 86 moves backward to its at rest position as shown in FIGS. 6 and 7, the cavity 94 will again align with the dispensing tube 95 to receive the next head 14 therefrom.

Referring now to FIGS. 6–9, the sequential operation and components of one embodiment of the present invention will be described. A drive shaft 100 extends through and is positioned on the axis of the rotating gear 73. The drive shaft 100 is journaled by bearings 101 in vertical supports 82 and 88. One end of the shaft 100 extending out of the vertical support 82 has attached thereto a cam plate 102. The opposite end of the shaft 100 extending out of the vertical support 88 has attached thereto a cam plate 103. Intermediate the ends of the shaft 100 is mounted a toothed wheel 104. To assure that cam plate 102, cam plate 103 and toothed wheel 104 retain their initial orientational relationship on the shaft 100, they are secured to the shaft 100 with a locking keys 105.

Indexing heads are commercially available with various movement configurations. According to the present invention, the preferred indexing head 77 drives an output shaft 106 to rotate less than 90° as an input shaft 107 is rotated between 0° and 180° during a first movement. As the shaft 107 is rotated through a second movement 180° to 360°, the shaft 106 remains stationary. The motor 72 is connected to the input shaft 107 by a coupling 108 to rotate the input shaft 107 continuously in one direction, whereas the output shaft 106 will rotate a predetermined number of degrees, then pause before again rotating the same number of degrees as it did during its first movement.

The input shaft 107 of the indexing head 77 has attached thereto a toothed gear 109. Both the gear 78 and the toothed gear 109 are prevented from slipping with respect to their respective shafts 106 and 107 by locking keys 112. A toothed timing belt 113 which is disposed about the toothed wheels 104 and 109 rotatively drives the drive shaft 100 whenever the shaft 107 is rotated. Although the diameter of the wheels 104 and 109 may not necessarily be the same and the rotational ratio not 1 to 1, the toothed timing belt 113 assures constant rotation of the drive shaft 100. The rotating gear 73 as driven by the gear 78 and the output shaft 106 will not rotate continuously as does shaft 100 but have brief pauses creating a stutter step motion. The cam plates 102 and 103 are fixed to the drive shaft 100 and will rotate continuously.

Figure 9:
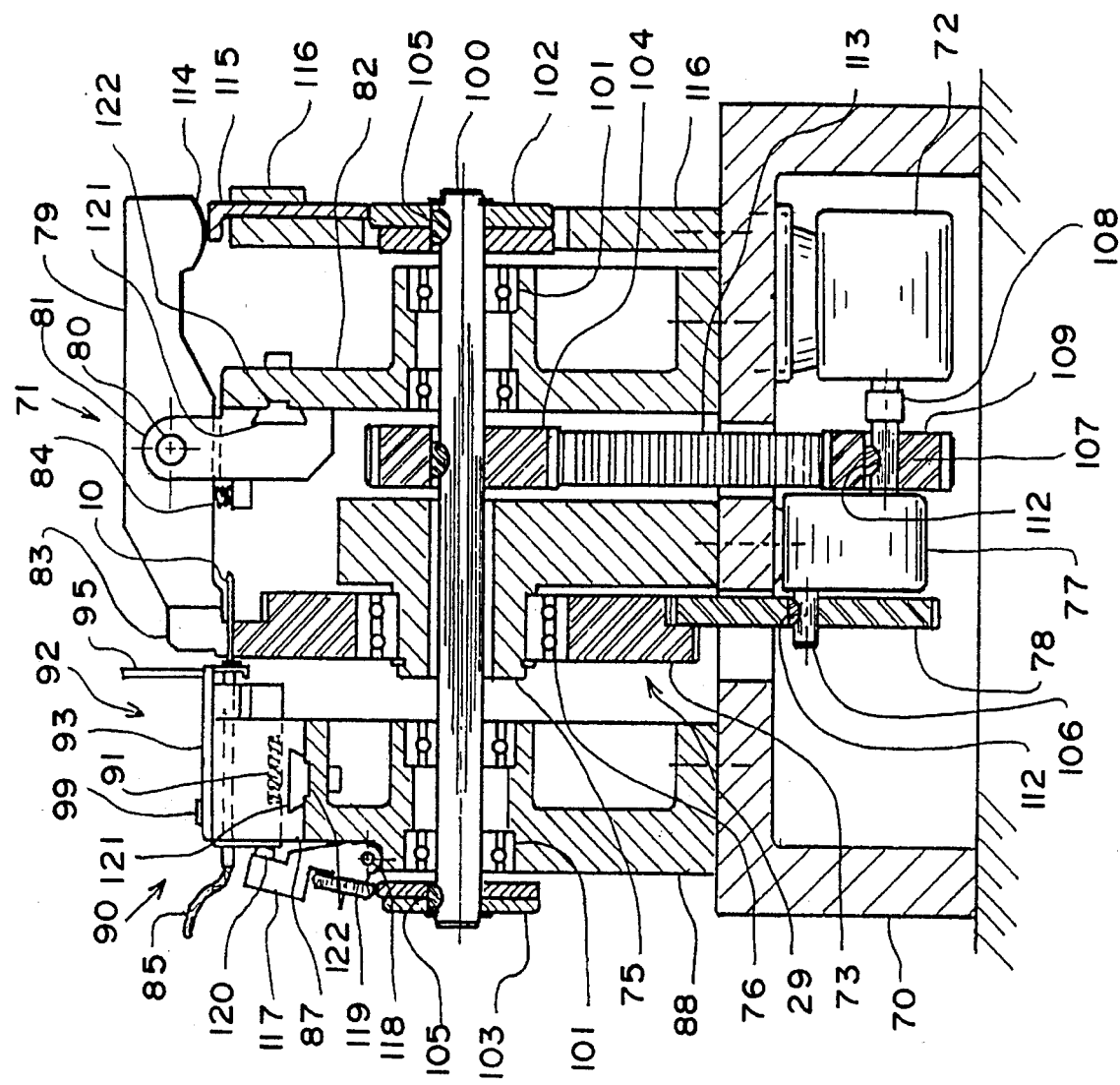
FIG. 9 is a cross-sectional view of the conveying and head welding devices taken along FIG. VII—VII of FIG. 5 during the pause and head welding operation.

Referring now to FIGS. 5–9, the clamping and head welding operations will be further described. As best shown in FIGS. 7 and 9, the clamping arm 79 rocks back and forth about the pivot 80 which is disposed intermediate its front portion 83 and its rear portion 114. Since the front portion 83 is disposed over the rotating gear 73 and the rear portion 114 is disposed over the push rod 115, the rocking motion of arm 79 is confined. To reduce waste motion, the front portion 83 that clamps the headless fastener 110 during the welding of the head 14 need only be raised enough to allow passage of the next headless fastener 110 thereunder.

The push rod 115 is confined by a vertical support 116 to move only in a vertical direction, as shown in FIGS. 7 and 9, and is positioned to have one of its ends disposed under the rear portion 114 of the arm 79 and its opposite end over the cam plate 102. The peripheral surface of the cam plate 102 has an undercut thereon (not shown) extending through an arc of about 180°; therefore, as shaft 100 rotates the cam plate 102, its undercut causes the push rod 115 to move reciprocally up and down as shown in FIGS. 7 and 9. The clamping arm 79 which is in contact with the push rod 115, thus rocks about its pivot 80.

Rectilinear movement of the housing 86 within the fixtures 87 is imparted by a rocker arm 117, which is pivotally mounted on the vertical support 88. In particular, the housing 86 moves back and forth between a first position shown in FIG. 7 wherein the housing 86 and the electrode 85 carried thereby is disposed to the left, away from the gear 73 and the headless fasteners 110 carried thereby, and a second position shown in FIG. 9 wherein the housing 86 and its electrode 85 are disposed to the right so that the electrode 85 engages and welds a head 14 to a headless fastener 110 to provide a headed fastener 10. To reduce wear, the rocker arm 117 comprises as shown in FIG. 5 a pivot 118, a roller bearing 119, and a rounded top portion 120 that remains in contact with the housing 86 (see FIGS. 7 and 9). The roller bearing 119 is positioned directly above the cam plate 103. The peripheral surface of the cam plate 103 has an undercut 123 thereon, which extends through an arc of approximately 180° similar to that undercut of the cam plate 102. As the drive shaft 100 rotates, the cam plate 103 rotates the rocker arm 117 clockwise as shown in FIGS. 7 and 9 to push the housing 86 toward its second position and the rotating gear 73. The spring 91 returns the housing 86 to its first position thus providing a rectilinear motion to the housing 86. As the housing 86 moves from its first position to its second positions, the head positioning arm 93 pivots about the pin 99 from its first position shown in FIG. 6 wherein its cavity 94 receives a head 14 from the head dispensing tube 95, to its second position as shown in FIG. 8 wherein the cavity 94 delivers the head 14 into a position to be welded with one of the headless fasteners 110 of the web 111.

One full cycle of operation of the second workstation 18 and its head welding assembly 24 will now be described. The cycle is repeated for each 360° rotation of the drive shaft 100. After the welding assembly 24 has completed welding a head 14 to a headless fastener 110 to form a headed fastener 10, the assembly 24 returns to its starting position in preparation for the next cycle. In its starting position as shown in FIG. 7, the roller bearing 119 rests against the undercut 123 portion of the cam plate 103 as shown in FIG. 5, the housing 86 is disposed in its first position spaced from the gear 73 as shown in FIG. 7, the push rod 115 rests against the undercut portion of the cam plate 102 as shown in FIG. 7, the front portion 83 of the clamping arm 79 is spaced from the gear 73 to receive the next headless nail 110, and a head 14 is transferred into the cavity 94 of the head position arm 93 as shown in FIG. 6.

As the drive shaft 100 continues to rotate, the cycle starts when the rotating gear 73 moves a headless fasteners 110 seated within one of its slots 74 into an aligned position to be welded. Next, the output shaft 106 of the indexing head 77 stops rotating and the rotating gear 73 stops momentarily. The larger portion of the cam plate 103 lifts the roller 119 to thereby pivot the rocker 117 and push the housing 86 to the right from its first position toward its second as shown in FIG. 9. Simultaneously as shown in FIGS. 7 and 9, the larger portion of cam plate 102 lifts the push rod 115 upward to pivot the arm 79 counterclockwise and to dispose the front portion 83 downward, thus clamping the aligned headless fastener 110 in a slot 74 of the gear 73, as shown in FIG. 9. As the housing 86 slides to the right to its second position as shown in FIG. 9, the pin 98 disposed within the contoured slot 97 forces head positioning arm 93 to rotate to its second position as shown in FIG. 8, wherein a head 14 seated within the cavity 94 of the arm 93 is aligned directly in front of the electrode 85. As the housing 86 is brought to its second position, the electrode 85 carried thereby presses the head 14 against the end of the headless fastener 116, as shown in FIGS. 8 and 9. When the housing 86 is brought to its second position its electrode 85 is subjected to an electrical impulse thus welding the head 14 to an aligned headless fastener 110 and forming a headed fastener 10.

As the drive shaft 100 and the cam plates 102 and 103 coupled thereto continue to rotate, the roller bearing 119 and the push rod 115 drop downward onto the undercut portions of the cam plates 102 and 103 respectively, thus allowing the housing 86 to return from its second position to its first position and the clamping arm 79 to pivot to its open position. Thereafter, the output shaft 106, the gear 78 and the rotating gear 73 again start to rotate, thus advancing the headed fastener 10 and bringing the next headless fastener 110 into an aligned position to have a head 14 welded thereto.

Referring now to FIGS. 2, 3 and 5–9, an alternate embodiment of the present invention for high speed production will be described. Even though it should take less than half a second to complete a cycle of the second workstation 18, to reach a higher production level it is necessary to work on more than one headless fastener 110 during each cycle of the second workstation 18. Rather than adding additional workstations, it is preferred to increase the number of the welding devices 90. As the number of welding devices 90 increased so does the output of headed fasteners 10. For example if three cycles can be accomplished per second, then adding another welding device 90 to the second workstation 18 will increase the output from 180 to 360 headed fasteners 10 per minute. Likewise by employing six (6) welding devices 90*a–f*, as best illustrated in FIGS. 2, 5 and 6, the output of the second workstation 18 can exceed 1000 headed fasteners 10 per minute. In such an embodiment, the clamping device 71 includes arms 79*a–f*, a corresponding one for each of the head welding devices 90*a–f*.

Alignment of the arms 90*a–f* and the head welding devices 90*a–f* is facilitated by attaching them respectively to the common vertical supports 82 and 88 by a dovetail block 121, as shown in FIGS. 7 and 9. A slot 122 for receiving one of the dovetail blocks 121 is cut into each of the vertical supports 82 and 88 to permit the plurality of welding devices 90*a–f* to be mounted along a semicircular path having its center on the axis of the drive shaft 100, as shown in FIGS. 2 and 5. This accomplishes two purposes in that spacing between adjacent welding devices 90 is easily adjusted and the positioning of the front portion 83 of the arms 79*a–f*, the housing 86 and the head positioning arm 93 retain the same relationship to the headless fastener 110 as the welding devices 90 are adjusted.

Since the output per minute is directly affected by the time the rotating gear 73 stops during the head welding operation, it is advantageous to have all of the welding devices 90*a–f* to operate simultaneously. As shown in FIGS. 5 and 6, six (6) welding devices 90*a–f* are mounted along the semicircular top path on the vertical support 88. In order to reduce the cost as well as wear on the components, the preferred embodiment employs two (2) rocker arms 117*a* and *b*, two (2) roller bearings 119*a* and *b*, and two (2) cam plates 103*a* and *b*, as best shown in FIG. 5. The cam plate 103*a* actuates the rocker arm 117*a* to in turn impart the described rectilinear movement to the group of welding devices 90*a*, *b* and *c*, while the cam plate 103*b* actuates the rocker arm 117*b* to move the group of welding devices 90*d*, *e* and *f*. It will be obvious to those skilled in the art that a separate rocker arm 117 can be used for each housing 86 of a welding device 92. It is also conceived that more than three (3) housings 86 can be actuated by each rocker arm 117.

Although the push rod 115 has linear movement instead of rotational, it should be appreciated that two (2) push rods 115 and two (2) cam plates 102 could be used to permit each push rod 117 to drive three (3) clamping arms 79.

Figure 10A:
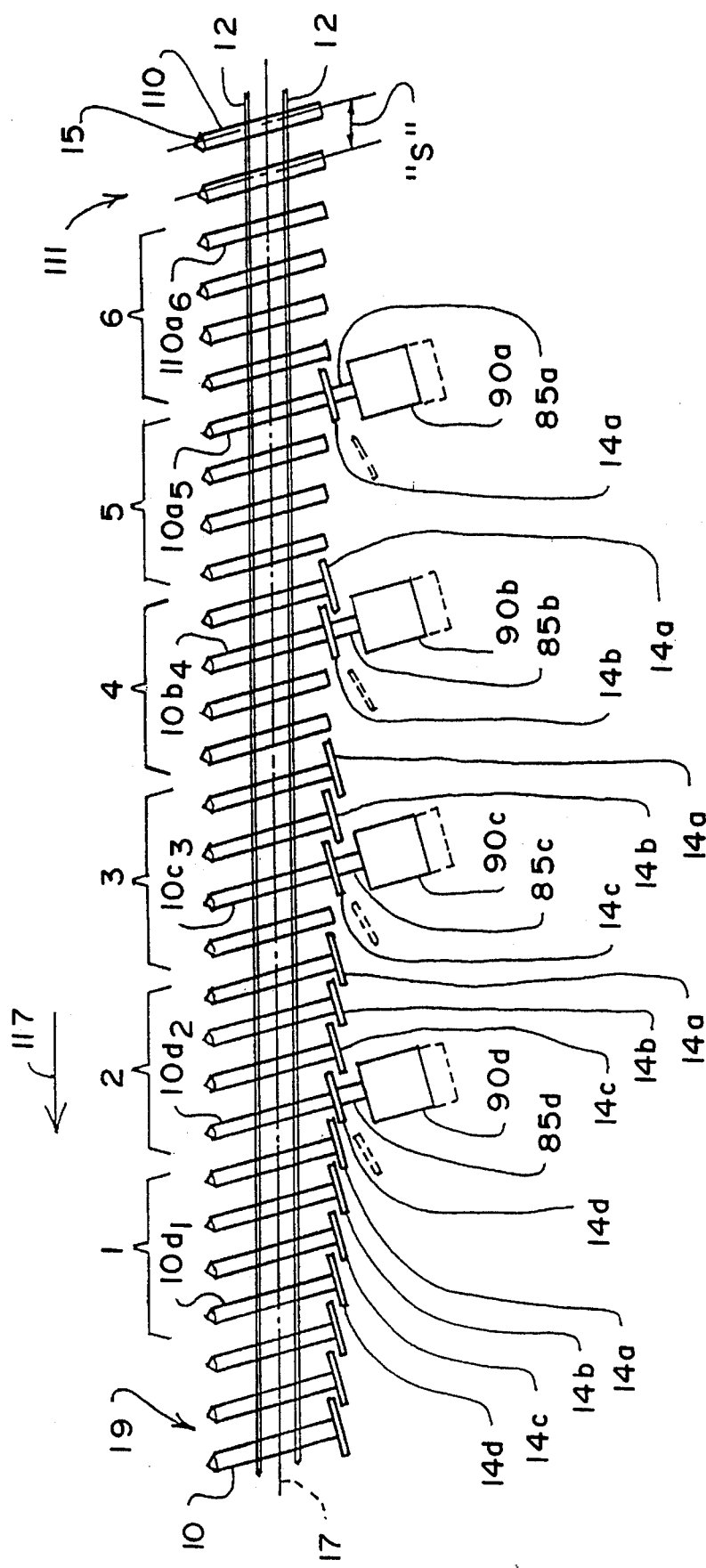
FIGS. 10A and B are each a partial top plan view of the continuous web of fasteners showing the schematic relationship between the fastener spacing in the web, the successive movements of the fasteners from one welding device to the next and a spacing of N+1 between successive ones of the N welding devices.

An important object of the present invention can be appreciated by referring to FIG. 1, which shows the relationship of the head 14 to the shank 13. Since a nail or fastener magazine for a fastener driving device has a confined volume, the number of headed fasteners 10 that can be loaded in such a magazine at one time is limited. To maximize that number, it is best to collate the fasteners 10 with the shank 13 portion closely spaced. Fasteners 10, such as those with round heads 14, cannot be spaced from one another by a spacing less than that of the diameter of the head 14 when collated in a straight line collation. As the head 14 becomes larger, the spacing increases and the maximum number of the headed fasteners 10 in the magazine becomes less. To overcome this problem, the collation can be effected with the heads 14 being partially overlapped as shown in FIGS. 1 and 10A and B. In particular, the web 111 of the headless fasteners 110 has a centrally disposed reference line 17, which is disposed substantially parallel to the direction, as indicated by arrow 117, in which the web 111 is being conveyed. The headed and headless fasteners 10 and 110 are disposed at an acute angle with respect to their reference line 17 to permit the head 14 on a headed fastener 10 to overshadow the head 14 of an adjacent fastener 10 and to thereby reduce the spacing between the shanks 13 of the adjacent fasteners 10. Headed fasteners 10 with heads 14 partially overlapping cannot be produced according to the teachings of U.S. Pat. No. 5,140,715 wherein the head is formed after collation. The head 14 can be made to form headed fastener 10 prior to collation. As a result, the number of such fasteners that may be disposed in a magazine is limited.

The present invention as shown in FIGS. 10A and B not only welds the heads 14 to the headless fasteners 110 assembled in a continuous web 111, but is also capable of welding multiple heads 14 simultaneously to form the continuous web 19 of the headed fasteners 10. Although FIGS. 10A and B show a portion of the web 19 (as seated on the conveying track 29) as produced by four (4) welding devices 90a, b, c and d system, it is obvious that the number of stations could be increased or decreased, e.g., six (6) such devices 90a–f as shown in FIG. 5. The web 111 of the headless fasteners 110 is moved from right to left as shown by the arrow 117 in FIGS. 10A and B past a series of spaced welding devices 90a, b, c and d to output from the last welding station 90d the web 19 of headed fasteners 10. Each of the welding stations 90a, b, c and d is supplied by a corresponding head dispensing tube 95, as described above, with one head 14 at a time; each head 14 is identified by a letter corresponding to that of its welding device 90. For example, the heads supplied to the welding device 90a are identified as 14a. After the heads 14 have been welded by a particular welding device 90, e.g., the first welding device 90a, and the web 111 has been moved past the welding device 90a, that head is identified by the numeral 14a.

As described above, the gear 73 has a plurality equally spaced slots 74 for receiving one of the headless fasteners 110 and is rotated by the indexing head 77 and gear 78 to bring the series of fasteners 110 to the first station 90a. The gear 73 momentarily stops, while the shank 13 of the headless fastener 110 is clamped and a head 14a is disposed between the end of the headless fastener 110 and the electrode 85. Then, the housing 86 moves the head 14a into contact with the aligned headless fastener 110 and is welded thereto to form a headed fastener 10.

Figure 10B:
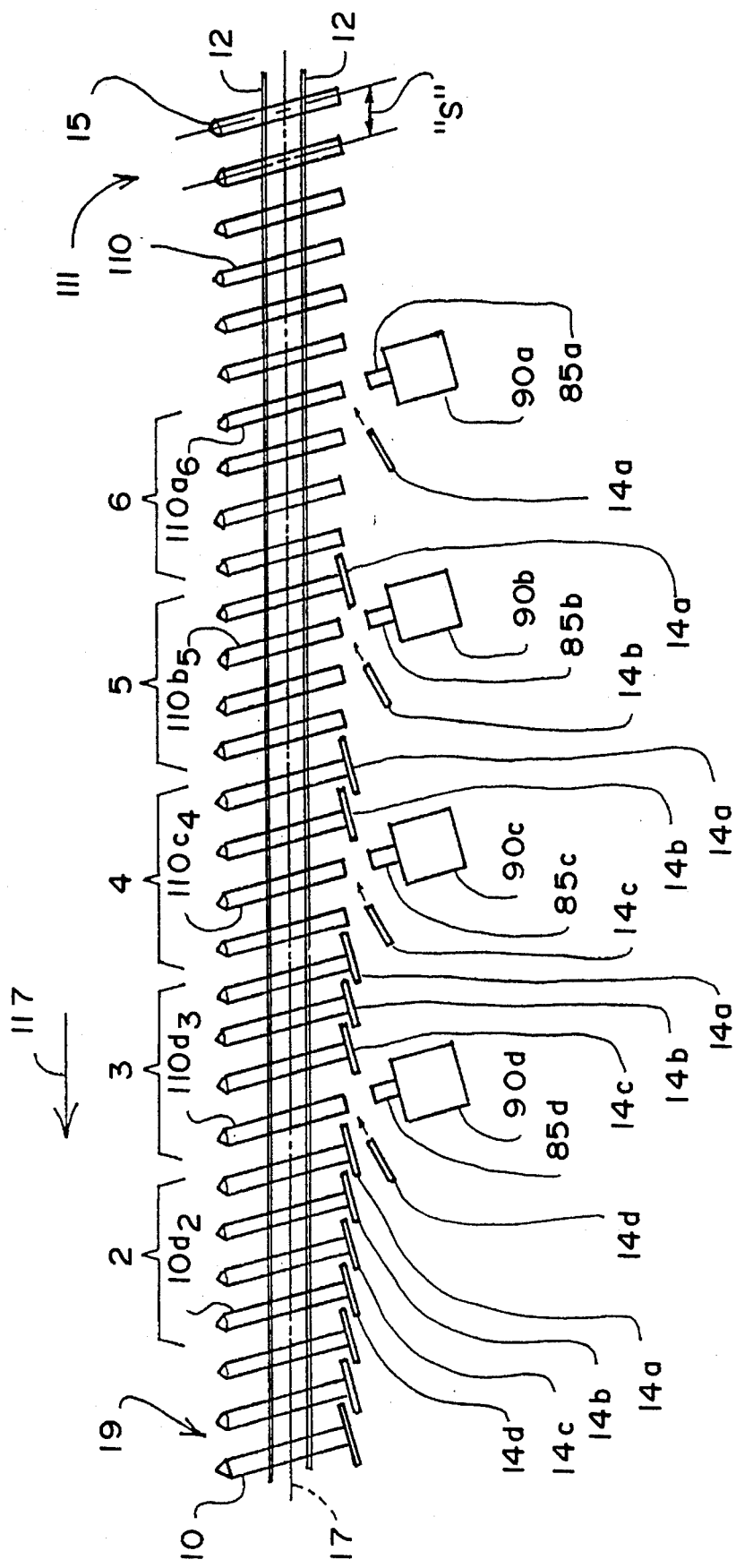

The gear 73 moves the web 111 of fasteners 110 to align a first set of the fasteners with corresponding ones of the welding devices 90. Then, the gear 73 rotates a distance between welding stops sufficient to align a second set of fasteners 110 with corresponding ones of the welding devices. That distance is set equal to the product of "n" and that spacing "s" between successive fasteners 110 (or 10) of the web 111 (or 19) as shown in FIG. 10B. It is appreciated that the fastener spacing "s" in turn determines the spacing between successive slots 74 of the gear 73. "n" is the number of welding devices 90. In FIGS. 10A and B, "n" is illustratively four (4) and the welding devices 90a–d are equally spaced from each other by a distance set equal to the product of ("n"+1) times the fastener spacing "s". An alternate arrangement of the welding devices 90 with a different spacing is described below with respect to FIG. 11.

The web 111 has been moved by the gear 73 and then momentarily stopped at the relative position shown in FIG. 10A, before the electrodes 85 of each of the welding devices 90a, b, c and d are simultaneously energized to weld the heads 14a, b, c and d to the corresponding headless fasteners 110 of the web 111. In FIG. 10A, six (6) sets of fasteners 110 are successively identified by the numerals 1, 2, 3, 4, 5 and 6. Each fastener 110 is identified by a letter subscript identifying that welding device 90 which welded its head 14 and a numeral subscript identifying to which fastener set it belongs. In FIG. 10A, fasteners 10a5, 10b4, 10c3 and 10d2 are respectively disposed adjacent welding devices 90a, b, c and d and were welded thereby.

After such a first welding, the gear 73 moves the web 111 the distance equal to "n" (e.g., four (4)) times the fastener spacing "s" to dispose a new set of headless fasteners 110 in an aligned relationship to the welding devices 90a, b, c and d, as shown in FIG. 10B; fasteners 110a6, 110b5, 110c4 and 110d3 are disposed respectively adjacent the welding devices 90a, b, c and d, and are to be welded thereby. As shown in FIGS. 10A and B, successive sets of fasteners, "n" fasteners in each set, are moved past the array of welding devices 90, periodically stopped to have a different fastener in each set welded to its head 14, before the web 111 is moved again the set distance, i.e., "n" times "s", to the next stop where the welding operation is repeated. The last headless fastener 110 in each set is welded by the welding device 90d. Fasteners 10d2 of set 2, 10c3 of set 3, 10b4 of set 4 and 10a5 of set 5 have just been welded as shown in FIG. 10A, and fasteners 110d3 of set 3, 110c4 of set 4, 110b5 of set 5 and 110a6 of set 6 are in position to be welded as shown in FIG. 10B. This method of welding permits the use of "n" welding devices 90 operating simultaneously to increase the rate of production by a factor of "n".

Though the mechanism for controlling the movement and alignment of the web 110 has been described primarily in physical terms, i.e., by the use of the indexing head 77, the cam plates 102 and 103 and their associated push rod 115 and rocker arm 117, it is appreciated that such control could be implemented by sensors, electromagnetic elements and control functions implemented by programmed microprocessors and/or IC-implemented hardwired circuits.

FIGS. 5 and 6 show a further illustrative embodiment, relationships where six (6) welding devices 90a, b, c, d, e, f are shown. In this embodiment, "n" equals six (6), the welding devices 90 are spaced apart a distance equal to N−1 fastener spacings "s", e.g., 5, where "N" equals 6. The conveying assembly 23, and its gear 73 and the indexing head 77 are adapted to advance six (6) spaces in each cycle as described above.

Figure 11:
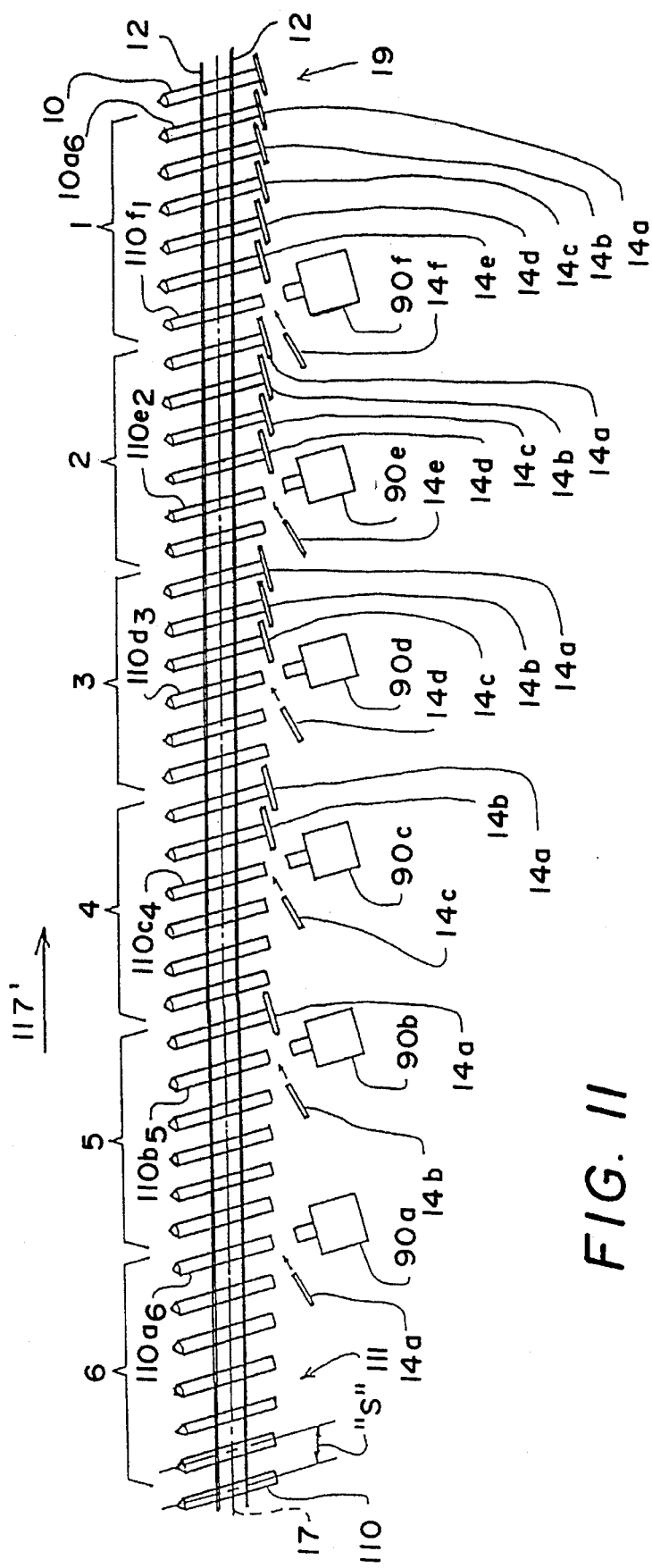
FIG. 11 is a partial top plan view of an alternative embodiment of the continuous web of fasteners showing the schematic relationship between the fastener spacing in the web, and a spacing of N−1 between successive ones of the N welding devices.

Referring now to FIG. 11, it can be seen that the movement of web 111 (or 19), as indicated by arrow 117', is opposite to that shown in FIGS. 10A and 10B. The web 19, as shown in FIG. 11, is produced by six (6) welding devices 90a–f equally spaced from each other by a distance set equal to the product of ("n"−1) times the fastener spacing "s".

After a first welding, the gear 73 moves the web 111 the distance equal to "n", e.g., six (6), times the fastener spacing "s" to dispose a new set of headless fasteners 110 in an aligned relationship to the welding devices 90a, b, c, d, e and f. As shown in FIG. 11, fasteners 110a6, 110b5, 110c4, 110d3, 110e2 and 110f1 are disposed respectively adjacent the welding devices 90a, b, c, d, e and f and are in position to be welded thereby. As shown in FIG. 11, successive sets of fasteners, "n" fasteners in each set, are moved past the array of welding devices 90, periodically stopped to have a different fastener in each set welded to its head 14, before the web 111 is moved again the set distance, i.e., "n" times "s", to the next stop where the welding operation is repeated. The last headless fastener 110 in each set is welded by the welding device 90f.

It must be realized that the direction of movement as indicated by arrows 117 or 117' and the welding device 90 spacing from each other by a distance set equal to the product of ("n"+1) or ("n"−1) times the fastener spacing "s" are alternative, illustrative embodiments of this invention. Thus the movement of web 111 in FIGS. 10A and 10B could have been left to right and movement of web 111 in FIG. 11 could be right to left with the number "n" and the spacing "s" of welding devices 90 remaining the same as shown in FIGS. 10A, 10B and 11.

Generally, the distance between adjacent welding devices 90 is set equal to "s"×[("m"×"n")±1], where "m" is equal to any integral number. It is appreciated that in FIGS. 10A and B, and 11 that "m" is set to 1.

The choice to position the welding devices 90 a distance set equal to the product of ("n"+1) or ("n"−1) times the spacing "s" is normally selected based upon the physical size of the welding devices 90 and the number of welding devices employed. By example should the spacing "s" in FIG. 10A be nine (9) mm and the number "n" welding devices 90 is relatively low, e.g., four (4), the welding devices 90 would be positioned on forty five (45) mm centers [("n"+1)×9 mm]. On the other hand if the spacing was chosen to be ("n"−1), the four (4) welding devices 90 would be positioned on twenty seven (27) mm centers [("n"−1)×9 mm]. Although the closer spacing, twenty seven (27 mm) of the welding devices 90 will provide a smaller head welding assembly 24, the physical constraint on the width of each welding device 90 may be too limited. Where "n" is relatively low, the spacing can be set as the product of ("n"+1) and "s" so that total size of the assembly 24 of welding devices is not too large.

As shown in FIG. 11 when the number "n" of welding devices 90 is increased, e.g., to six (6), the preferred spacing of welding devices 90a–f is equal to the product of ("n"−1) times the fastener spacing "s". Again for example wherein "n" is six (6) and the spacing "s" is nine (9) mm, the welding devices 90 are positioned on forty five (45) mm centers [("n"−1)×9 mm]. Should the positioning of welding devices 90a–f be chosen to be ("n"+1), the center distance would have been sixty three (63) mm [("n"+1)×9] which may render the head welding assembly 24 larger than desired.

Referring back to FIG. 2, it is obvious that the first workstation 16 to produce the continuous web 111 of headless fasteners 110 and second workstation 18 to produce the continuous web 19 of headed fasteners 10 can be operated as independent workstations. Although it is preferred that the continuous web 111 produced in the first workstation 16 feed directly into the second workstation 18, the continuous web 111 could be stored and later processed in the second workstation 18. The second workstation 18 could also be located further away from the first workstation 16 or even disposed in a remote location with respect to the second workstation 18.

Referring again to FIGS. 2 and 3, a measuring or counting device (not shown) is used to actuate the severing assembly 25 to cut the web 19 of headed fasteners 10 to a selected length or number of fasteners 10 to form the strips or assemblies 11 of headed fasteners 10. If the required length or number of fasteners 10 is to be used in a tool requiring the fastener 10 to be in a coiled form, a coiling device 66 may be used. Several types of coiling devices are readily available. FIGS. 2 and 3 disclose one type of coiling device. The coiling device disclosed operates by connecting the leading end of the continuous web 19 of headed fasteners 10 onto a hook which is mounted on a horizontal, rotating shaft 67. A motor 68 rotates the shaft 67 and pulls the web 19 to form a coiled assembly 69. The severing assembly 25 then cuts the web 19 to the selected length or number of fasteners 10. The coiled assembly 69 is then removed and the leading end of the next fastener assembly or web 19 is hooked onto the rotating shaft 67.

It should be noted that the coiling device 66 would not be used when producing an assembly 11 of fasteners 10 to be used in a tool that requires fasteners in strip form as opposed to coiled form. It will be appreciated that the various embodiments of the invention which have been illustrated and described as including a vertically standing framework may also include an inclined or tilted framework at 90° or at any degree therebetween and perform equally as well. The orientation of all of the components or movements previously referred to herein would be suitably adjusted to compensate for the alignment of the framework.

Having described presently the preferred embodiments of the invention, it is to be understood that the invention may be otherwise embodied within the scope of the appended claims.

I claim:

1. A method of affixing heads to headless fasteners, the headless fasteners assembled as a web of headless fasteners equally spaced apart a given spacing, said method comprising the steps of:

a) conveying the web of headless fasteners to and disposing each of a first set of headless fasteners thereof in an aligned relationship to corresponding ones of a plurality of "n" head affixing devices, the head affixing devices of the plurality being spaced from each other a distance equal to the product of the given spacing and ("n"±1);

b) actuating each of the plurality of head affixing devices to fasten a head to its aligned fastener of the web; and c) moving the web with respect to the plurality of "n" head affixing devices a distance equal to the product of "n" and the given spacing to align each of a second, different set of fasteners of the web to corresponding ones of the plurality of "n" head affixing devices.

2. The method of affixing heads as claimed in claim 1, wherein step b) simultaneously actuates each the plurality of the head affixing devices.

3. The method of affixing heads as claimed in claim 1, wherein step b) actuates each of the plurality of the head affixing devices during a time period during which each of the first set of headless fasteners is maintained in the aligned relationship with its corresponding one head affixing device.

4. The method of affixing heads as claimed in claim 1, wherein said method further comprises the step of repeating steps b) and c) until a head is affixed to each headless fastener of the web.

5. The method of affixing heads as claimed in claim 1, wherein each of the head affixing devices upon actuation welds a head to its aligned headless fastener.

6. The method of affixing heads as claimed in claim 1, wherein said method further comprised the step of supplying a head to the headless fastener aligned at each of the "n" head affixing devices before step b) is effected.

7. The method of affixing heads as claimed in claim 1, wherein said method further comprises the step of assembling the headless fasteners into the web having a reference line extending the length thereof, said step of assembling comprising the substeps of aligning each of the headless fasteners in a parallel relationship to each other and at an acute angle with respect to the reference line, whereby the diameter of the heads affixed to the headless fasteners may exceed the given spacing.

8. Apparatus for affixing heads to headless fasteners, the headless fasteners assembled as a web of the headless fasteners equally spaced apart a given spacing, said apparatus comprising:

a) a plurality of "n" head affixing devices, adjacent of said plurality of "n" head affixing devices being spaced from each other a distance equal to the product of the given spacing and ("n"±1), each of said plurality of "n" head affixing devices being actuatable to affix a head to an aligned headless fastener of the web; and b) actuatable means for conveying the web with respect to said plurality of "n" head fixing devices a set distance equal to the product of "n" and the given spacing and for disposing each of a selected set of "n" headless fasteners in an aligned relationship with respect to corresponding ones of said plurality of "n" head affixing devices.

9. The apparatus for affixing heads as claimed in claim 8, wherein there is further included means for actuating each of said plurality of "n" head affixing devices to affix a head to each headless fastener of said selected set while each headless fastener of said selected set remains in said aligned relationship and thereafter for actuating said actuatable conveying means to advance the web said set distance to thereby align each of a new selected set of "n" headless fasteners with respect to a corresponding one of said plurality of "n" head affixing devices.

10. The apparatus for affixing heads as claimed in claim 8, wherein there is further included for each of said plurality of "n" head affixing devices means for delivering one head at a time from a supply of the heads to a position adjacent an end of an aligned headless fastener in preparation for being affixed thereto by its head affixing device.

11. The apparatus for affixing heads as claimed in claim 8, wherein there is further included for each of said plurality of "n" head affixing devices means for clamping its corresponding one of said selected set of "n" headless fasteners in said aligned relationship for the time required to actuate each of said plurality of "n" head affixing devices to be actuated to affix a head to each of said selected set of "n" headless fasteners.

12. The apparatus for affixing heads as claimed in claim 8, wherein said conveying means comprises a track for receiving the web of the headless fasteners, said track having a plurality of slots spaced apart said given spacing for receiving respective ones of the headless fasteners.

13. The apparatus for affixing heads as claimed in claim 12, wherein said track comprises a gear with said slots disposed about its periphery, and a motor rotatively driving said gear with respect to said plurality of "n" head affixing devices.

14. The apparatus for affixing heads as claimed in claim 13, wherein each of said "n" head affixing devices includes a housing mounted for rectilinear movement between a remote position and a proximate welding position with respect to said gear, and a welding electrode mounted on its housing to be disposed in said aligned relationship with respect to a corresponding one headless fastener of said selected set when said housing is disposed in said proximate welding position.

15. The apparatus for affixing heads as claimed in claim 14, wherein said conveying means rotates said gear through an angular distance equal to the product of "n" and the given spacing and for halting the rotation of said gear for a period of time sufficient to permit the actuation of each of said plurality of "n" head affixing devices to weld a head to each headless fastener of said selected set.

16. The apparatus for affixing heads as claimed in claim 14, wherein each of said "n" head affixing devices includes a clamping device for clamping the corresponding one headless fastener in its slot for said time period which is sufficient to permit each housing of said "n" head welding devices to be disposed to their proximate positions and pulses of electrical energy applied to their electrodes to weld a head to each headless fastener of said selected set.

17. A method for machining a strand of wire to provide assemblies of a selected number of headed fasteners, said process comprising the steps of:
 a) cutting the strand of wire into headless fasteners of a selected, uniform length;
 b) aligning the headless fasteners in a parallel relationship to each other and equally spaced a given spacing from each other;
 c) collating the headless fasteners to form a continuous web of the headless fasteners;
 d) conveying the continuous web of collated headless fasteners and aligning one headless fastener with respect to a head welding device;
 e) supplying one head at a time to the head welding device; and
 f) while maintaining the web stationary, actuating the head welding device to weld a head on one end of the aligned fastener of the continuous web.

18. The machining method as claimed in claim 17, wherein there is a plurality of "n" head welding devices, the "n" head welding devices being spaced from each other a distance equal to the product of the given spacing and ("n"±1), step d) conveys the web of headless fasteners and aligns a first selective set of the headless fasteners thereof to corresponding ones of the plurality of "n" head welding devices, step f) actuates each of the plurality of "n" welding devices to weld a head to each of the aligned headless fasteners of the first selective set, and moving the continuous web with respect to the plurality of "n" head welding devices a distance equal to the product of "n" and the given spacing to align each of a second, different set of the headless fasteners to corresponding ones of the plurality of "n" head welding devices.

19. The machining method as claimed in claim 18, wherein step f) actuates each of the plurality of the head affixing devices during a time period during which each of the first set of headless fasteners is maintained in the aligned relationship with its corresponding one head welding device.

20. The machining method as claimed in claim 18, wherein said method further comprises the step of repeating the actuating step and the moving step until a head is affixed to each headless fastener of the web.

21. Apparatus for receiving a strand of wire and producing therefrom a web of headed fasteners, said apparatus comprising:
 a) means for cutting the strand of wire into headless fasteners of a selected, uniform length;
 b) means for receiving and aligning the headless fasteners in a parallel relationship with each other and spaced from each other a given spacing;
 c) means for collating the parallel, spaced headless fasteners to form a continuous web thereof;
 d) a welding device disposed downstream of said collating means; and
 e) means for repeatedly conveying the continuous web of headless fasteners to said welding device and stopping said continuous web to align at least one headless fastener of the continuous web with respect to said head welding device for a period sufficient for said head welding device to weld a head to the one aligned headless fastener.

22. The producing apparatus as claimed in claim 21, wherein there is included a plurality of "n" of said head welding device, each of said "n" plurality of said head welding devices being spaced from an adjacent one by a distance equal to the product of ("n"±1) and the given spacing.

23. The producing apparatus as claimed in claim 22, wherein said conveying means conveys the continuous web before stopping a distance equal to the product of "n" and the given spacing to dispose each of a selected set of the "n" headless fasteners in an aligned relationship with respect to corresponding ones of said plurality of "n" head welding devices.

24. The producing apparatus as claimed in claim 23, wherein there is further included for each of said plurality of "n" head welding devices means for delivering one head at a time from a supply of the heads to a position adjacent an end of an aligned headless fastener in preparation for being affixed thereto by its head affixing device.

25. The producing apparatus as claimed in claim 23, wherein there is further included for each of said plurality of "n" head welding devices means for clamping its corresponding one of said selected set of "n" headless fasteners in said aligned relationship for the time required to actuate each of said plurality of "n" head welding devices to be actuated to weld a head to each of said selected set of "n" headless fasteners.

26. A method of affixing heads to headless fasteners, the headless fasteners assembled as a web of headless fasteners equally spaced apart a given spacing, said method comprising the steps of:
  a) conveying the web of headless fasteners to and disposing each of a first set of headless fasteners thereof in an aligned relationship to corresponding ones of a plurality of "n" head affixing devices, selected of the head affixing devices of the plurality being spaced from each other a first distance equal to the product of the given spacing and an integral number other than "n";
  b) actuating each of the plurality of head affixing devices to fasten a head to its aligned fastener of the web; and
  c) moving the web with respect to the plurality of "n" head affixing devices a second distance sufficient to align each of a second, different set of fasteners of the web to corresponding ones of the plurality of "n" head affixing devices.

27. The method of affixing heads as claimed in claim 26, wherein the first distance is equal to product of the given spacing and [("m"×"n")±1], where "m" is an integral number.

28. The method of affixing heads as claimed in claim 26, wherein the second distance is equal to the product of "n" and the given spacing.

* * * * *